No. 873,171.　　　　　　　　　　　　　　PATENTED DEC. 10, 1907.
W. J. RICHARDS.
MOTOR CONTROL SYSTEM.
APPLICATION FILED SEPT. 29, 1906.
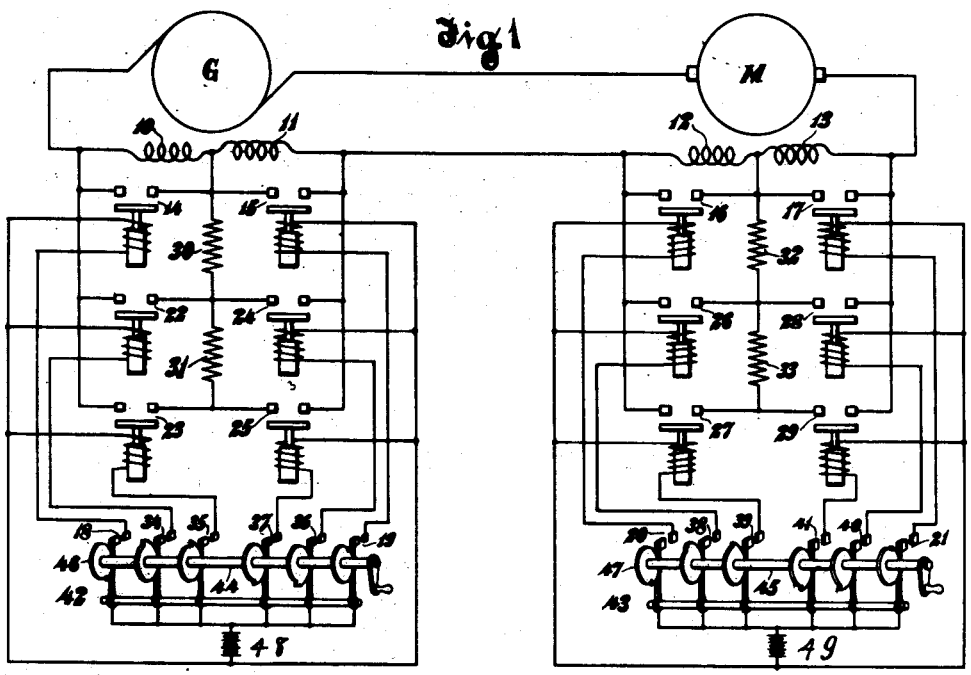
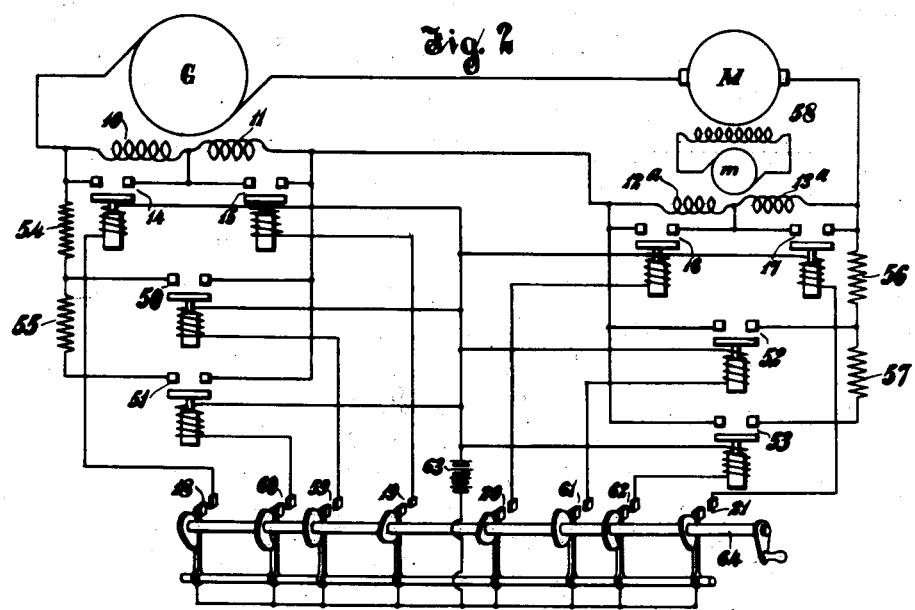
Witnesses
Oliver Sherman
Fred J. Kinsey
Inventor
Walter J. Richards
By
Chas. E. Lord
Attorney

UNITED STATES PATENT OFFICE.

WALTER J. RICHARDS, OF NORWOOD, OHIO, ASSIGNOR TO ALLIS-CHALMERS COMPANY, A CORPORATION OF NEW JERSEY.

MOTOR-CONTROL SYSTEM.

No. 873,171.    Specification of Letters Patent.    Patented Dec. 10, 1907.

Application filed September 29, 1906. Serial No. 336,666.

*To all whom it may concern:*

Be it known that I, WALTER J. RICHARDS, citizen of the United States, residing at Norwood, in the county of Hamilton and State of Ohio, have invented certain new and useful Improvements in Motor-Control Systems, of which the following is a full, clear, and exact specification.

My invention relates to motor control systems and especially to control systems for mill and hoisting motors.

In operating rolling mills and mine hoisting machinery and in many other kinds of work, it is necessary that the working motors be quickly and often reversed. My invention aims to obtain this result while avoiding the difficulties which prior electrical systems with the same object in view have encountered.

To this end my invention in one aspect consists in a motor control system comprising a generator, a motor the armature of which is exclusively supplied by said generator, and remotely controlled electrically operated means for controlling the electromotive force of the generator. There is also provided remotely controlled means for varying and reversing the field of the motor.

From another point of view my invention consists of a generator, a motor supplied thereby, opposing field windings for both the generator and the motor, and means for rendering inoperative one field winding on either machine.

In a more specific aspect my invention consists of a motor having opposing series field windings, a generator for supplying said motor and also having opposing series field windings, means for short-circuiting either field winding of either machine, and means for shunting the remaining field winding of each machine by variable resistances.

Many other features of my invention will appear from the description and drawings and will be pointed out in the appended claims.

Figure 1 represents one embodiment of my invention; and Fig. 2 shows a modification.

In Fig. 1 a generator G supplies a working motor M. The generator G has opposing series field windings 10 and 11 and the motor opposing series field windings 12 and 13. In shunt to the windings 10, 11, 12 and 13 are normally-open, solenoid-operated switches 14, 15, 16 and 17 respectively. The solenoids of these switches are controlled by switches 18, 19, 20 and 21 respectively, operated in any desired manner as by one or more master controllers. The field windings 10, 11, 12 and 13 may also be shunted by means of solenoid switches 22 and 23, 24 and 25, 26 and 27, and 28 and 29. When these switches are closed they do not short-circuit their respective field windings but merely shunt them with one or more sections of resistance. Thus the switches 22 and 24 when closed shunt their respective field windings by resistance section 30, while switches 23 and 25 when closed connect the resistance sections 30 and 31 in shunt to their respective field windings. Similarly the switches 26 and 28 shunt their associated field windings 12 and 13 respectively by resistance section 32, while switches 27 and 29 shunt said windings by both the resistance sections 32 and 33. Any desired number of these switches and resistance sections may be used. The circuits of the solenoids of switches 22 to 29 inclusive are controlled by switches 34 to 41 inclusive respectively. The switches 18 to 21 inclusive and 34 to 41 inclusive are operated by one or more master controllers, two such controllers 42 and 43 being shown in this figure. These controllers are here shown as controlling the switches associated respectively with the generator and the motor. When the shaft 44 or 45 of these controllers is turned, the cams 46 or 47 thereon operate the master controlling switches in any desired manner, the arrangement as shown in controller 42 being such that the switches 14, 25, and 24 are successively operated in the order named when the controller is moved in one direction from its central or "off" position, while the switches 15, 23 and 22 are successively operated in the order named when the controller is moved in the other direction. The master controller 43 similarly completes the operating circuits of the switches 16, 29 and 28 in the order named when it is moved in one direction from its central position, and when moved in the other direction causes the successive operation of the switches 17, 27 and 26. This order of movement is not an essential part of my present invention and may be varied as desired. The controlling circuits are supplied by batteries 48 and 49, though other sources of supply may be used if desired.

By means of the system shown in Fig. 1, the motor M may be operated in either direction, operating as a series motor. The reversing of the field connections of the generator is especially intended to be used when the motor is being slowed down and is running as a generator to supply current to operate the dynamo G as a motor.

In Fig. 2, instead of having separate sets of switches for varying the resistance in shunt to each motor or generator field winding, a single set of switches 50 and 51 controls the resistance in shunt to both generator field windings, while another single set 52 and 53 controls the resistance in shunt to both motor field windings. These switches connect together the outside terminals of the entire field winding of the generator or the motor and include in shunt thereto one or more of the resistance sections 54, 55, 56 and 57. This resistance is only effective as a regulating shunt to one of each pair of the opposing field windings because the other field winding at the time when this shunt circuit is closed is always short-circuited by one of the switches 14 to 17 inclusive. In this figure the field windings 12ª and 13ª which control the motor M are not wound directly on the field frame of the motor M, but instead energize the field for an exciter $m$ driven in any desired manner. The exciter $m$ supplies the field winding 58 of the motor, which field varies in proportion to the variations of the exciter field strength. If desired a similar exciter may be used for the generator field. The circuits of the solenoids of the switches 50 to 53 inclusive are controlled by switches 59 to 62 inclusive. These solenoids are here shown as supplied by a battery 63. The switches of the master controller are all operated by eccentrics mounted on the single shaft 64, thus allowing the motor and generator circuits to be controlled by a single controller. The order of operation may be any desired, and the operation of the system is in general similar to that described above in connection with Fig. 1.

I have described my invention in what I now consider to be its preferred form but in the following claims I aim to cover all those modifications which readily occur to one skilled in the art and which come within the spirit and scope of my invention.

What I claim is:—

1. In combination, a generator, a motor supplied thereby, opposing field windings for both the generator and the motor, and means for short-circuiting one field winding on either machine.

2. In combination, a motor having opposing series field windings, a generator for supplying said motor and also having opposing series field windings, and means for short-circuiting either field winding on either machine.

3. In combination, a motor having opposing series field windings, a generator for supplying said motor and also having opposing series field windings, means for short-circuiting one field winding on each machine, and means for regulating the remaining field winding of each machine.

4. In combination, a generator having opposing series field windings, means for short-circuiting either of said field windings, and means for regulating the remaining field winding.

5. In combination, a motor having opposing series field windings, a generator for supplying said motor and also having opposing series field windings, means for short-circuiting either field winding on either machine, and means for shunting the remaining field winding of each machine by variable resistances.

6. In combination, a generator having opposing series field windings, means for short-circuiting either of said field windings, and means for shunting the remaining field winding by a variable resistance.

7. In combination, a generator having opposing series field windings, means for short-circuiting one of said field windings, and means for shunting the remaining field winding by a variable resistance.

8. In combination, a motor having opposing series field windings, a generator for supplying said motor and also having opposing series field windings, means for short-circuiting one field winding on each machine, and remotely controlled means for regulating the effect of the remaining field winding of each machine.

9. In combination, a generator having opposing series field windings, means for short-circuiting either of said field windings, and remotely controlled means for regulating the remaining field winding.

10. In combination, a motor having opposing series field windings, means for short-circuiting either of said field windings, and means for regulating the remaining field winding.

11. In combination, a motor having opposing series field windings, means for short-circuiting one of said field windings, and means for regulating the remaining field winding.

12. In combination, a motor having opposing series field windings, means for short-circuiting either of said field windings, and means for shunting the remaining field winding by a variable resistance.

13. In combination, a motor having opposing series field windings, means for short-circuiting either of said field windings, and remotely controlled means for regulating the strength of the remaining field winding.

14. In combination, a motor having opposing series field windings, means for rendering either of said field windings ineffective, and means for varying the effect of the remaining field winding.

15. In a system of motor control, a generator, a motor supplied thereby, opposing field windings for both the generator and the motor, and means for rendering either field winding on either machine ineffective.

16. In a system of motor control, a generator, a motor supplied thereby, opposing field windings for both machines, means for rendering either field winding on either machine ineffective, and means for regulating the remaining field windings.

17. In combination, a generator having opposing series field windings, means for rendering either of said field windings ineffective, and means for varying the effect of the remaining field winding.

18. In combination, a dynamo-electric machine having opposing field windings, means for deënergizing either of said field windings, and means for regulating the effect of the remaining field winding.

19. In combination, a dynamo-electric machine having opposing field windings, and remotely controlled means for deënergizing either of said field windings and for regulating the remaining field winding.

20. In combination, a dynamo-electric machine having opposing field windings, solenoid switches for deënergizing either of said field windings, and means for regulating the remaining field winding.

21. In combination, a dynamo-electric machine having differential field windings, solenoid switches for rendering either of said field windings ineffective, and solenoid switches for regulating the effect of the remaining field windings.

22. In combination, a dynamo-electric machine having differential field windings, solenoid switches for rendering either of said field windings ineffective, solenoid switches for regulating the effect of the remaining field windings, and a master controller for all of said solenoid switches.

23. A system of motor control, comprising a generator, a motor supplied thereby, and opposing series field windings for both the generator and the motor.

24. A system of motor-control, comprising a generator, a motor supplied thereby, opposing series field windings for both the generator and the motor, and magnetically operated switches for short-circuiting either field winding of either machine.

25. A system of motor control, comprising a generator, a motor supplied thereby, opposing series field windings for both the generator and the motor, magnetically operated switches for short-circuiting either field winding of either machine, and one or more master controllers for said switches.

26. A system of motor control, comprising a generator, a motor supplied thereby, opposing series field windings for both the generator and the motor, magnetically operated switches for short-circuiting either field winding of either machine, and means for regulating the effect of the remaining field winding.

27. A system of motor control, comprising a generator, a motor supplied thereby, opposing series field windings for both the generator and the motor, magnetically operated switches for short-circuiting either field winding of either machine, and magnetically operated switches for shunting the remaining field windings by resistances.

28. A system of motor control, comprising a generator, a motor supplied thereby, opposing series field windings for both the generator and the motor, magnetically operated switches for short-circuiting either field winding of either machine, and magnetically operated switches for shunting the remaining field windings by resistances of different values.

29. A system of motor control, comprising a generator, a motor supplied thereby, opposing series field windings for both the generator and the motor, magnetically operated switches for short-circuiting either field winding of either machine, magnetically operated switches for shunting the remaining field windings by resistances, and one or more master controllers for all of said solenoid switches.

30. A system of motor control, comprising a generator, a motor supplied thereby, opposing series field windings for both the generator and the motor, magnetically operated switches for short-circuiting either field winding of either machine, magnetically operated switches for shunting the remaining field windings by resistances of different values, and one or more master controllers for all of said solenoid switches.

31. A motor control system comprising a generator, a motor the armature of which is exclusively supplied by said generator, and remotely controlled electrically operated means for controlling the electromotive force of said generator.

32. A motor control system comprising a motor, a generator supplying the armature thereof, and remotely controlled means for varying the field strengths of said motor and said generator.

33. A motor control system comprising a generator, a motor the armature of which is exclusively supplied by said generator, and remotely controlled means for varying the electromotive force of the generator and reversing the field of the motor.

34. A motor control system comprising a motor, a generator supplying the armature thereof, and remotely controlled means for varying the field of said generator and for varying and reversing the field of said motor.

35. A motor control system comprising a motor, a generator supplying the armature thereof, and electrically operated means for varying the electromotive force of said generator and the field strength of the motor.

36. A motor control system comprising a motor, a generator supplying the armature thereof, and electrically operated means for varying the electromotive force of the generator and varying and reversing the field of the motor.

37. A motor control system comprising a generator, a motor the armature of which is exclusively supplied by said generator, and solenoid operated switches for controlling the electromotive force of said generator.

38. A motor control system comprising a generator, a motor the armature of which is exclusively supplied by said generator, solenoid operated switches for controlling the electromotive force of said generator, and remote means for controlling said switches.

39. A motor control system comprising a motor, a generator supplying the armature thereof, and solenoid operated switches for controlling the electromotive force of said generator and the field strength of the motor.

40. A motor control system comprising a motor, a generator supplying the armature thereof, and solenoid operated switches for controlling the electromotive force of said generator and varying and reversing the field of the motor.

41. A motor control system comprising a motor, a generator supplying the armature thereof, solenoid operated switches for controlling the electromotive force of said generator and the field strength of the motor, and remote means for controlling said switches.

42. A motor control system comprising a generator, a motor supplied thereby, solenoid operated switches for controlling the electromotive force of said generator and varying and reversing the field of the motor, and remote means for controlling said switches.

43. A motor control system comprising a generator, a motor the armature of which is exclusively supplied by said generator, and solenoid operated switches for controlling the field strength of said generator.

44. A motor control system comprising a generator, a motor the armature of which is exclusively supplied by said generator, solenoid operated switches for controlling the field strength of said generator, and remote means for controlling said switches.

45. A motor control system comprising a motor, a generator supplying the armature thereof, and solenoid operated switches for controlling the field strengths of the generator and motor.

In testimony whereof I affix my signature, in the presence of two witnesses.

WALTER J. RICHARDS.

Witnesses:
   Geo. B. Schley,
   Fred J. Kinsey.